US009456220B2

(12) United States Patent
Takazawa et al.

(10) Patent No.: US 9,456,220 B2
(45) Date of Patent: Sep. 27, 2016

(54) IMAGE CODING METHOD, IMAGE CODING DEVICE, IMAGE PROCESSING APPARATUS, AND IMAGE TRANSMITTING/RECEIVING SYSTEM

(71) Applicants: Kazuhiro Takazawa, Kanagawa (JP); Satoshi Aoki, Kanagawa (JP); Yasuhiro Kajiwara, Kanagawa (JP); Tamon Sadasue, Kanagawa (JP); Kenji Suzuki, Tokyo (JP); Kazufumi Matsushita, Kanagawa (JP)

(72) Inventors: Kazuhiro Takazawa, Kanagawa (JP); Satoshi Aoki, Kanagawa (JP); Yasuhiro Kajiwara, Kanagawa (JP); Tamon Sadasue, Kanagawa (JP); Kenji Suzuki, Tokyo (JP); Kazufumi Matsushita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/790,788

(22) Filed: Jul. 2, 2015

(65) Prior Publication Data

US 2016/0014429 A1 Jan. 14, 2016

(30) Foreign Application Priority Data

Jul. 11, 2014 (JP) ................................ 2014-143420

(51) Int. Cl.
  *G06K 9/36* (2006.01)
  *H04N 19/60* (2014.01)
  *H04N 19/164* (2014.01)
(52) U.S. Cl.
  CPC ............ *H04N 19/60* (2014.11); *H04N 19/164* (2014.11)

(58) Field of Classification Search
  USPC ....... 382/248, 232, 233, 239, 177, 274, 260; 345/545, 555, 557; 375/240, 240.11
  See application file for complete search history.

(56) References Cited

U.S. PATENT DOCUMENTS

| | | | | |
|---|---|---|---|---|
| 8,098,947 B2 * | 1/2012 | Fukuhara | ............... | H04N 19/63 382/239 |
| 8,254,707 B2 * | 8/2012 | Fukuhara | ............. | H04N 19/139 375/240.11 |
| 8,395,634 B2 * | 3/2013 | Ando | ..................... | H04N 19/63 345/545 |
| 8,665,943 B2 * | 3/2014 | Fukuhara | ............... | H04N 19/63 375/240 |
| 8,954,427 B2 * | 2/2015 | Silber | ............... | G06F 17/30864 707/728 |
| 2007/0201752 A1 | 8/2007 | Gormish et al. | ............... | 382/232 |
| 2008/0063078 A1 | 3/2008 | Futenma et al. | ......... | 375/240.19 |
| 2013/0307774 A1 | 11/2013 | Hayashi et al. | ............... | 345/158 |

FOREIGN PATENT DOCUMENTS

JP  2007-235961  9/2007
JP  2008-028541  2/2008

* cited by examiner

*Primary Examiner* — Anh Do
(74) *Attorney, Agent, or Firm* — Oblon, McClelland, Maier & Neustadt, L.L.P.

(57) ABSTRACT

An image coding device encodes image data in units of encoding line number that is number of lines necessary for implementing encoding. The image coding device includes: an image-data transforming unit that transforms image data of lines, number of which is smaller than the encoding-line number, into to-be-encoded image data of the encoding-line number of lines; and an encoding unit that encodes the to-be-encoded image data.

8 Claims, 16 Drawing Sheets

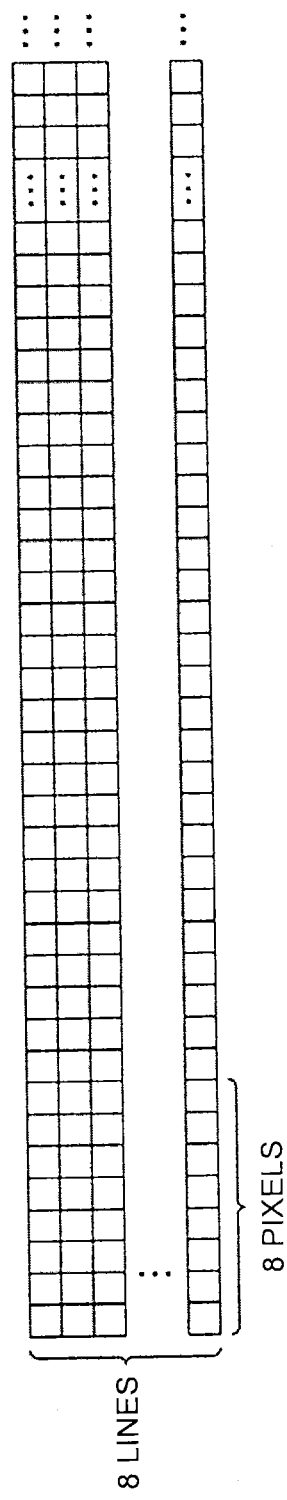

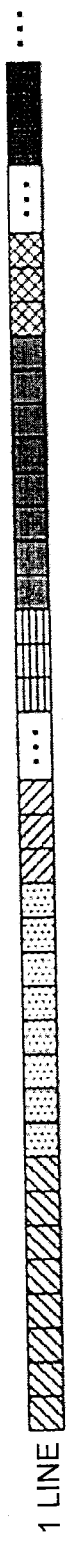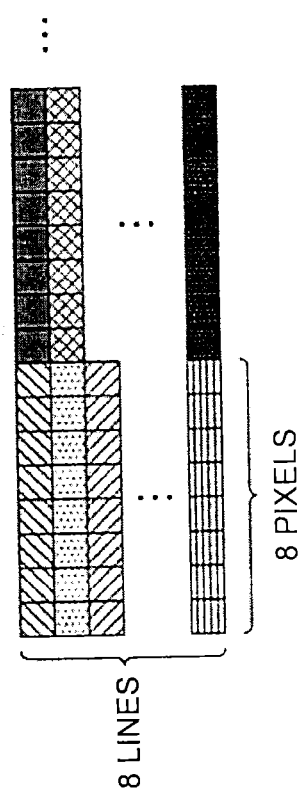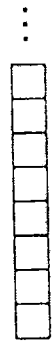
FIG.7A 1 LINE
FIG.7B 8 LINES 8 PIXELS
FIG.7C

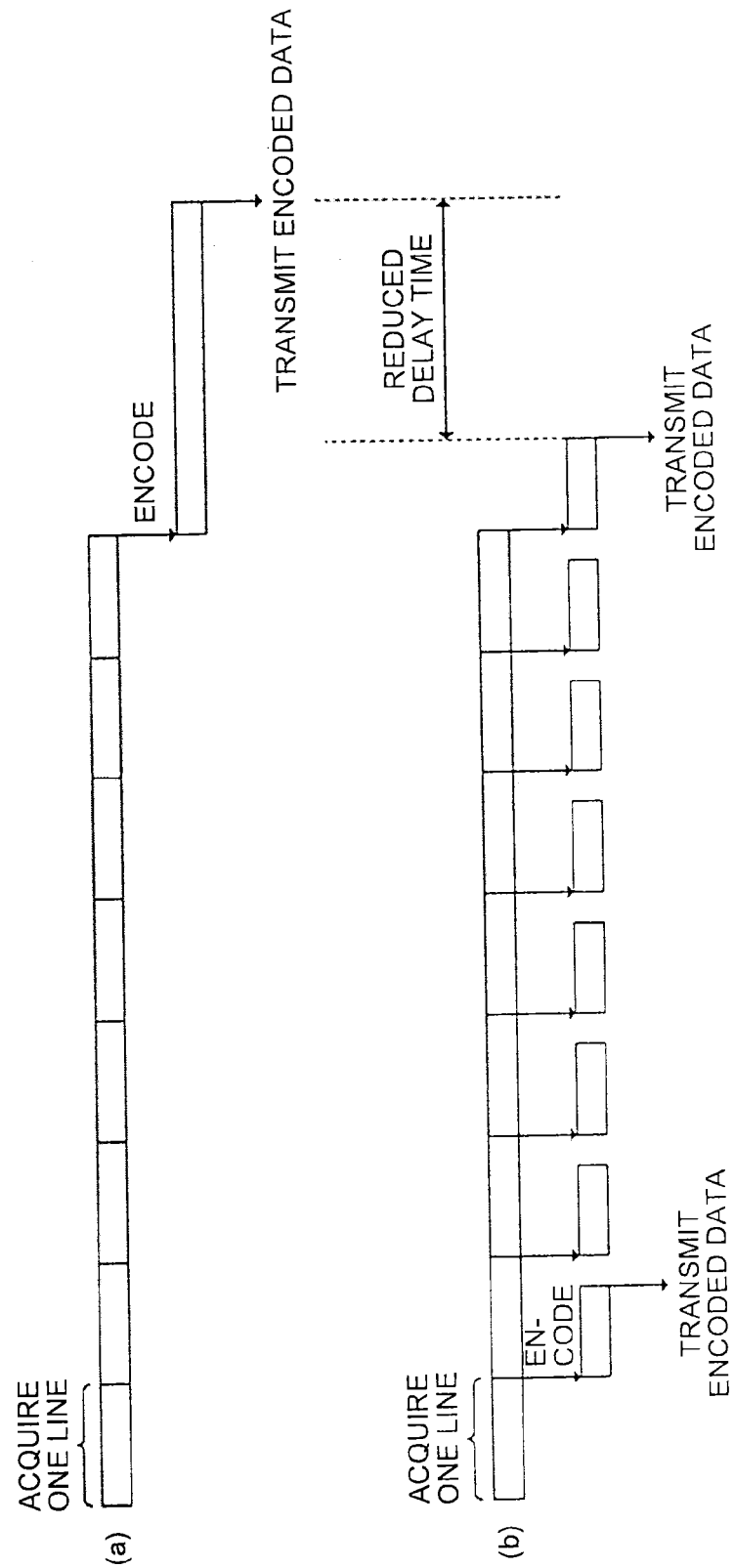

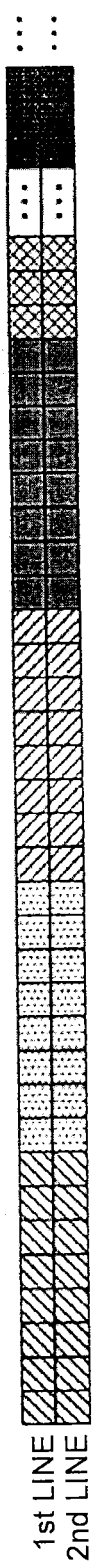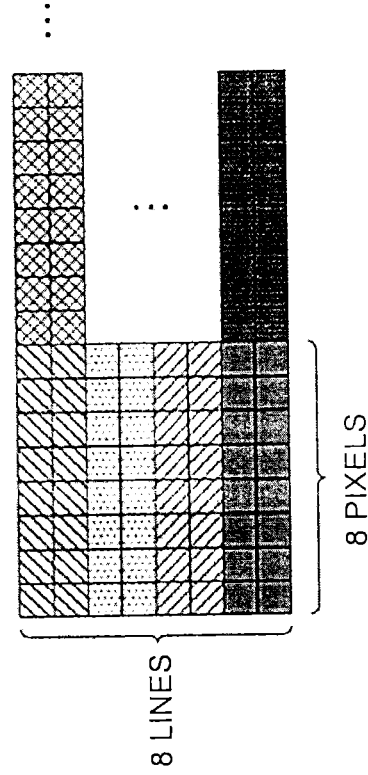
FIG.9A
FIG.9B

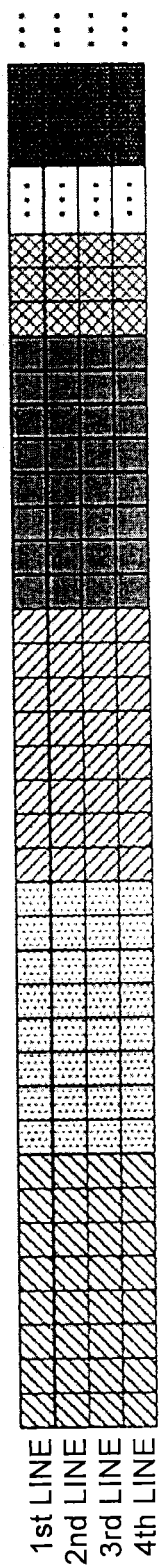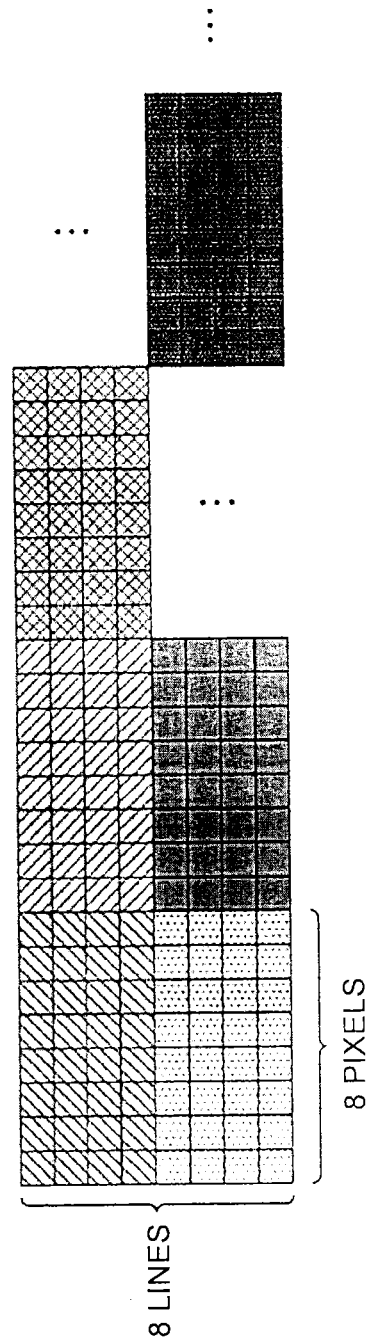
FIG.10A
FIG.10B

| TRAFFIC LEVEL | NUMBER OF REARRANGEMENT LINES |
|---|---|
| 0 | 1 LINE |
| 1 | 2 LINES |
| 2 | 4 LINES |

| REARRANGEMENT ID | NUMBER OF REARRANGEMENT LINES |
|---|---|
| 0 | 1 LINE |
| 1 | 2 LINES |
| 2 | 4 LINES |

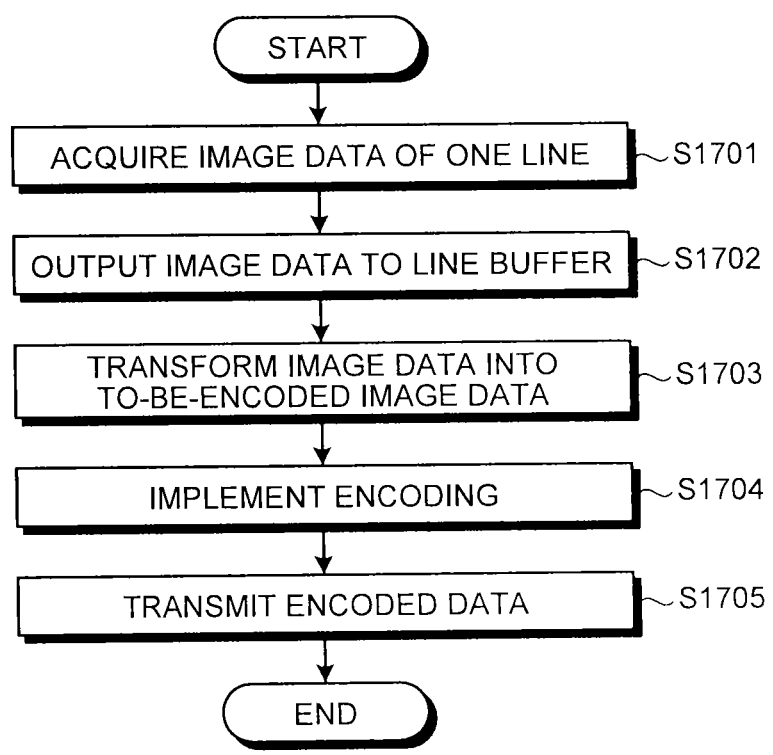

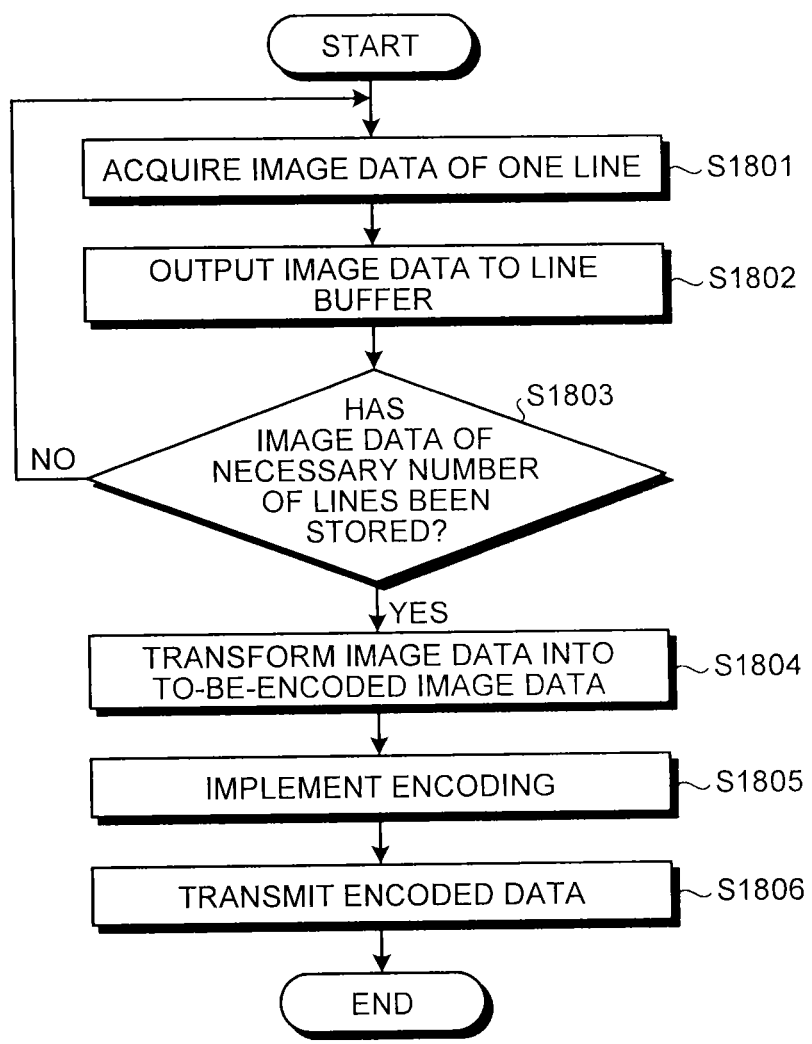

IMAGE CODING METHOD, IMAGE CODING DEVICE, IMAGE PROCESSING APPARATUS, AND IMAGE TRANSMITTING/RECEIVING SYSTEM

CROSS-REFERENCE TO RELATED APPLICATIONS

The present application claims priority to and incorporates by reference the entire contents of Japanese Patent Application No. 2014-143420 filed in Japan on Jul. 11, 2014.

BACKGROUND OF THE INVENTION

1. Field of the Invention

The present invention relates to an image coding method, an image coding device, an image processing apparatus, and an image transmitting/receiving system and, more particularly, to a process for encoding image data with consideration given to a delay in transmission of encoded image data.

2. Description of the Related Art

It is common to transmit data representing a moving image or a still image (hereinafter, collectively referred to as "image") captured using a security camera, a vehicle-mounted camera, or the like to an image receiving apparatus over a network. The amount of data transmitted in this manner increases in proportion to image quality such as resolution, frame rate, and bit depth. However, because the bandwidth of a network for use in such transmission image data is limited, a restriction is imposed on quality of image data to be transmitted.

To enable transmission of image data of higher quality with such a limited network bandwidth, it is general compress image data using a codec such as a JPEG (joint photographic experts group) codec or an H.264 codec and transmit the compressed image data.

It is proposed to packetize image data, which is transformed by line-based wavelet transformation and is it units of a precinct, by rearrangement for each frequency component for the purpose of transmitting the image data with low delay and efficiently, (see, for example, Japanese Laid-open Patent Application No. 2008-028511).

An image compression process is typically performed in units of a fixed data amount. For example, a JPEG compression process is performed by accumulating image data in buffers or the like until the image data of at least 8 lines is stored, and performing the compression process in units of accumulated image data of 8 lines. When the compression process is performed in units of a determined number of lines in this manner, the compression process waits for the image data of the necessary number of lines to be buffered, which can cause a delay in transmission of compressed image data and impair real-time transmission. A similar problem arises as well in the technique disclosed in Japanese Laid-open Patent Application No. 2008-028541 because this technique includes suspending line-based wavelet transformation until a necessary number of lines are buffered.

Under the circumstances, there is a need for a technique for reducing a transmission delay caused by image data compression.

SUMMARY OF THE INVENTION

It is an object of the present invention to at least partially solve the problems in the conventional technology.

An image coding device encodes image data in units of encoding line number that is number of lines necessary for implementing encoding. The image coding device includes: an image-data transforming unit that transforms image data of lines, number of which is smaller than the encoding-line number, into to-be-encoded image data of the encoding-line number of lines; and an encoding unit that encodes the to-be-encoded image data.

An image transmitting/receiving system transmits and receives image data encoded in units of encoding line number that is number being number of lines necessary for implementing encoding. The image transmitting/receiving system includes: an image-data transforming unit That transforms image data of lines, number of which is smaller than the encoding-line number, into to-be-encoded image data of the encoding-line number of lines; an encoding unit that encodes the to-be-encoded image data; an image-data transmitting unit that transmits encoded data that is the encoded image data; a decoding unit that decodes the transmitted encoded data; and an image-data reconstructing unit that reconstructs decoded image data into not-yet-transformed image data.

An image coding method encodes image data in units of encoding line number that is number of lines necessary for implementing encoding. The image coding method includes: transforming image data of lines, number of which is smaller than the encoding-line number, into to-be-encoded image data of the encoding-line number of lines; and encoding the to-be-encoded image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6A and 6B are diagrams illustrating how image data is encoded in the conventional network camera for comparison with an image-data rearranging process according to the embodiment;

FIGS. 7A to 7C are diagrams illustrating how image data is encoded in the network camera according to the embodiment;

FIG. 8 is a diagram illustrating, in time sequence, an encoding process according to the embodiment;

FIGS. 9A and 9B are diagrams illustrating how image data of two lines is encoded in the network camera according to the embodiment;

FIGS. 10A and 10B are diagrams illustrating how image data of four lines is encoded in the network camera according to the embodiment;

FIG. 17 is a flowchart illustrating operations of elements of the network camera according to the embodiment; and FIG. 18 is a flowchart illustrating operations of the elements of the network camera according to the embodiment.

DETAILED DESCRIPTION OF THE PREFERRED EMBODIMENTS

First Embodiment

A first embodiment of the present invention is described below in detail. In the description given below, the present embodiment is implemented as an image transmitting/receiving system including an image processing apparatus and an image receiving apparatus. The image processing apparatus that performs image data processing such as image data encoding and image data transmission is embodied as a network camera. The image receiving apparatus receives image data transmitted from the image processing apparatus via a network.

Figure 1:
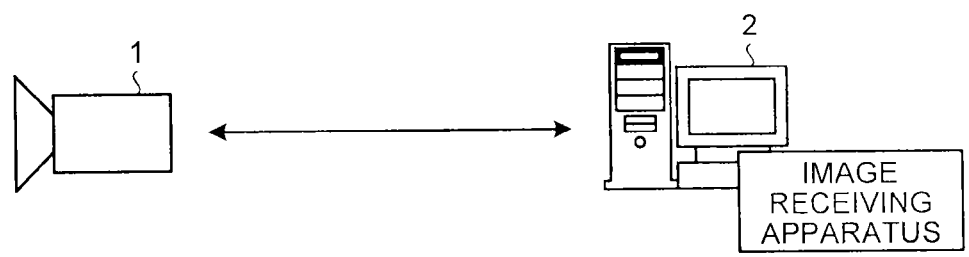
FIG. 1 is a diagram illustrating an example utilization form of an image transmitting/receiving system according to an embodiment of the present invention.

FIG. 1 is a diagram illustrating an example utilization form of the image transmitting/receiving system. As illustrated in FIG. 1, the image transmitting/receiving system according to the present embodiment includes a network camera 1 and an image receiving apparatus 2 connected to each other via a network such as the Internet or a LAN (local area network).

The network camera 1 which may be a security camera or a vehicle-mounted camera, for example, generates data representing a moving image or a still image (hereinafter, collectively referred to as "image") by capturing an image of an image capture subject and transmits the data to the image receiving apparatus 2. The image receiving apparatus 2 receives the image data transmitted from the network camera 1 and displays the received image data and/or performs image recognition, for example.

Figure 2:
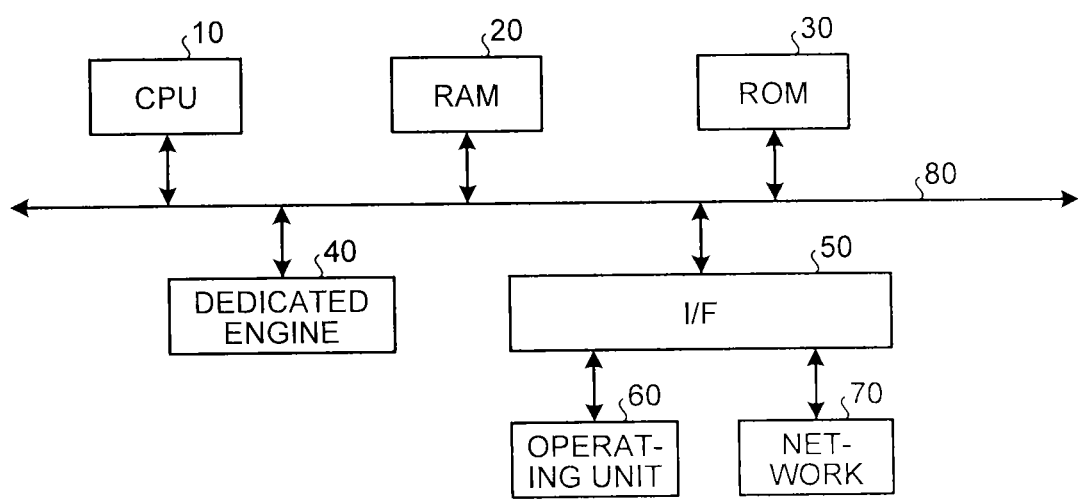
FIG. 2 is a diagram illustrating a hardware configuration of a network camera according to the embodiment.

Hardware of the network camera 1 included in the image transmitting/receiving system according the present embodiment is described below. FIG. 2 is a block diagram illustrating a hardware configuration of the network camera 1 according to the present embodiment.

As illustrated in FIG. 2, the network camera 1 according to the present embodiment includes a CPU (central processing unit) 10, a RAM (random access memory) 20, a ROM (read only memory) 30, a dedicated engine 40, and an I/F 50 connected to each other via a bus 80. An operating unit 60 and a network 70 are connected to the I/F 50.

The CPU 10 is a processing unit that controls overall operations of the network camera 1. The RAM 20 is a volatile storage medium to and from which information can be written and read out and used as a working area in information processing performed by the CPU 10. The ROM 30 is a read-only non-volatile storage medium where program instructions such as various types of control programs and firmware are stored.

The dedicated engine 40 is hardware for implementing a dedicated function of the network camera 1. The dedicated engine 40 may be, for example, a processing device performing processing for rearranging pixels of image data acquired line by line. The processing device may be implemented in an ASIC (application specific integrated circuit), for example.

The I/F 50 provides and controls connection between the bus 80 and various types of hardware, a network, and the like. The operating unit 60 is user interface that allows a user to enter information to the network camera 1. The operating unit 60 may be, for example, various hard buttons and a touch panel. The network 70 is an interface that allows the network camera 1 to carry out network communication with other equipment.

In such hardware configuration, the CPU 10 performs processing in accordance with a program stored in the ROM 30 or a program loaded onto the RAM 20, thereby configuring software control units. Functional blocks that implement functions of the network camera 1 included in the image transmitting/receiving system according to the present embodiment are implemented in combination of the software control units configured as described above and hardware.

The image receiving apparatus 2 has a hardware configuration similar to that of an information processing apparatus such as a typical PC (personal computer) or a server. More specifically, the image receiving apparatus 2 includes, in addition to the hardware configuration illustrated in FIG. 2, an LCD (liquid crystal display), which is connected to the I/F 50, and an HDD (hard disk drive).

Figure 3:
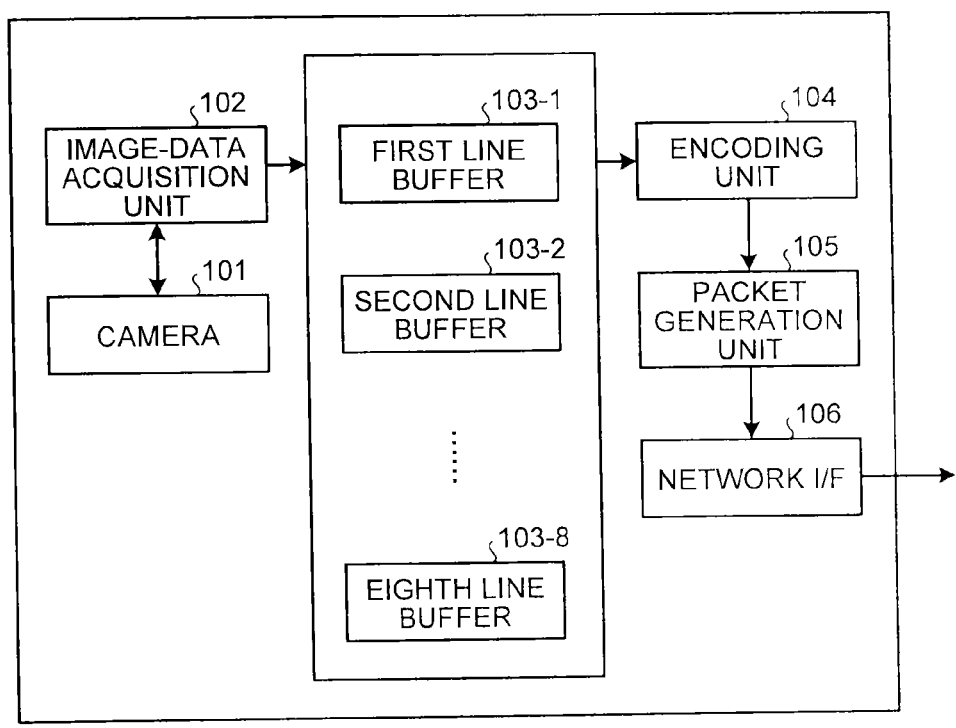
FIG. 3 is a block diagram illustrating a functional configuration of a conventional network camera or comparison with the network camera according to the embodiment.

A functional configuration of a conventional network camera is described below for comparison purpose prior to describing a functional configuration of the network camera 1 according to the present embodiment. FIG. 3 is a block diagram illustrating a functional configuration of functions which are related to an image-data encoding process and an image-data transmission process and which are provided by the conventional network camera. In the present embodiment, it is assumed that "encoding process" is encoding involving compression, and "encoding (process)" is equivalent to "compression (process)".

As illustrated in FIG. 3, the conventional network camera includes a camera 101, an image-data acquisition unit 102, line buffers 103-1 to 103-8, an encoding unit 104, a packet generation unit 105, and a network I/F 106.

The camera 101 is an image capturing device that captures an image using an imaging capturing element such as a CCD (charge coupled device) or a CMOS (complementary metal oxide semiconductor) and outputs the image as digital data.

The image-data acquisition unit 102 acquires an image generated by the camera 101 capturing an image of an image capture subject as digital data and outputs the acquired image data to the line buffers 103-1 to 103-8 (hereinafter, "the first to eighth line buffers") line by line.

Each of the first to eighth line buffers is a storage medium where the image data of one line (hereinafter, sometimes referred to as "line data") output from the image-data acquisition unit 102 is to be stored. The first to eighth line buffers, the number of which is equal to the number of the lines necessary for the encoding unit 101, which will be described later, to encode image data, are provided. The encoding unit 104 encodes image data in units of the encoding line number that is the number of lines necessary for implementing encoding (e.g., 8 lines). For this reason, the network camera 1 includes the eight (the first to eighth) line buffers.

The encoding unit 104 acquires the line data stored in the first to eighth line buffers and encodes the image data in units of 8 lines using a JPEG scheme. The encoding unit 104 outputs the encoded image data to the packet generation unit 105.

More specifically, the encoding unit 104 so its the acquired image data of 8 lines into blocks of, for example, 8 lines by 8 pixels and transforms the image data from the spatial domain to the frequency domain by DCT (discrete cosine transform) block by block. The encoding unit 104 quantizes the transformed data and encodes the quantized data by entropy coding.

The packet generation unit 105 packetizes the encoded image data (hereinafter, "encoded data") output from the encoding unit 104 to convert the encoded data to a data format that can be transmitted via a network. The packet generation unit 105 also functions as an image-data transmitting unit that transmits the packetized data (hereinafter, "packet data") to other equipment such as the image receiving apparatus 2 via the network I/F 106.

The network I/F 106 is an interface that allows the network camera 1 to communicate with other equipment such as the image receiving apparatus 2 over the network. An interface such as an Ethernet (registered trademark) interface, a Bluetooth (registered trademark), or a Wi-Fi (wireless fidelity) interface may be used as the network I/F 106.

More specifically, the image-data acquisition unit 102 outputs line data for the first to eighth lines to the eight (the first to eighth) line buffers, respectively. When the line data has been stored in the eight (the first to eighth) line buffers, the encoding unit 104 encodes the line data in the line buffers. When the line data in the first to eighth line buffers has been encoded, the image-data acquisition unit 102 then outputs line data for the ninth to sixteenth lines to the eight (the first to eighth) line buffers, respectively. This procedure is repeatedly performed until all the line data of the image data is encoded.

As described above, the conventional network camera temporarily stores a necessary number of lines, necessary for encoding, of image data line by line. Therefore, the conventional network camera is required to include as many line buffers as the lines necessary for encoding, which increases circuit size. Furthermore, because an encoding process cannot be performed until line data is stored in all the line buffers, a delay occurs in transmission of encoded data.

Figure 4:
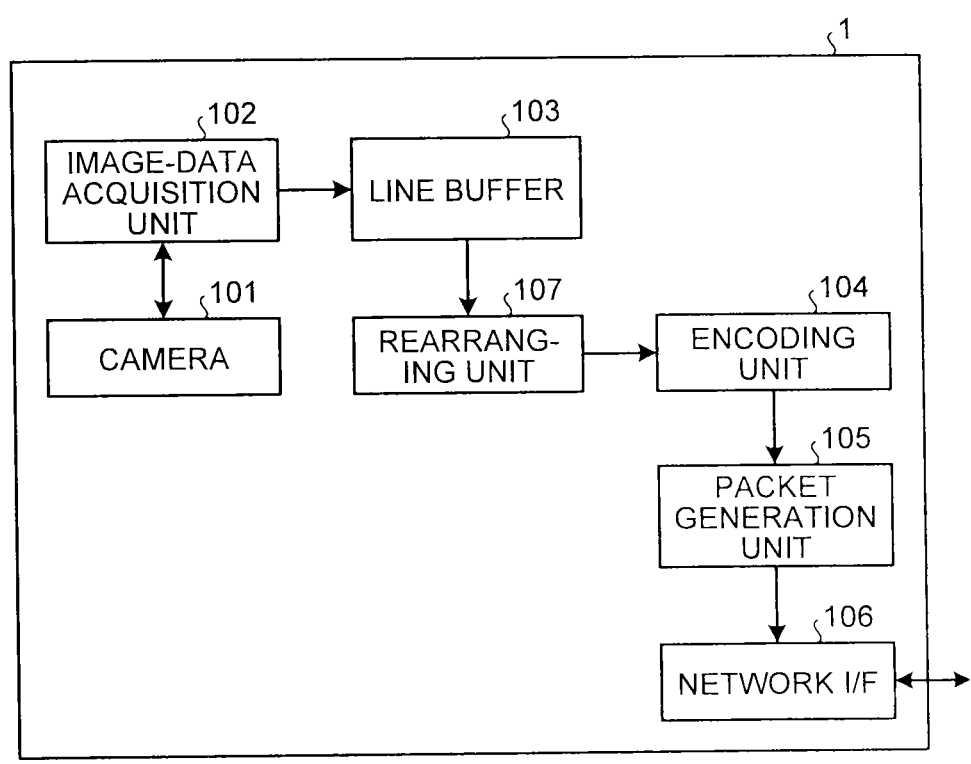
FIG. 4 is a block diagram illustrating a functional configuration of the network camera according to the embodiment.

A feature of the present embodiment lies in an encoding process that reduces such a delay in transmission of encoded data. As a configuration according to the present embodiment, a functional configuration of functions which are related to the image-data encoding process and an image-data transmission process and which are provided by the network camera 1 according to the present embodiment is described below. FIG. 4 is a block diagram illustrating the functional configuration of the functions involved in the image-data encoding process and the image-data transmission process out of the functions of the network camera 1 according to the present embodiment.

As illustrated in FIG. 4, the network camera according to the present embodiment differs from the configuration illustrated in FIG. 3 in that the eight (the first to eighth) line buffers are replaced with a single line buffer 103 and that a rearranging unit 107 added.

The camera 101 is similar to the camera 101 described above with reference to FIG. 3. As described above with reference to FIG. 3, the image-data acquisition unit 102 acquires digital data representing an image generated by the camera 101 capturing an image and outputs the acquired image data of one line to the line buffer 103.

The rearranging unit 107 rearranges the image data of one line stored in the line buffer 103 into image data (hereinafter, "to-be-encoded image data") made up of the encoding-line number of lines (e.g., 8 lines), which is the number of lines necessary for implementing encoding, and outputs the rearranged image data to the encoding unit 104. A feature of the present embodiment lies in this rearranging process performed by the rearranging unit 107. The rearranging process will be described in detail later.

The encoding unit 104 encodes the to-be-encoded image data output from the rearranging unit 107. Accordingly, the encoding unit 104 according to the present embodiment encodes the image data line by line. A feature of the present embodiment lies in the function as an image coding device including the rearranging unit 107 and the encoding unit 104 described above.

The packet generation unit 105 and the network I/F 106 operate in a manner similar to that described above with reference to FIG. 3.

More specifically, the image-data acquisition unit 102 outputs line data for the first line to the line buffer 103 first. The line data stored in the line buffer 103 is rearranged by the rearranging unit 107 into to-be-encoded image data, which is then encoded by the encoding unit 104. When the line data for the first line has been encoded, the image-data acquisition unit 102 then outputs line data for the second line to the line buffer 103. This procedure is repeatedly performed until all the line data of the image data is encoded.

Figure 5:
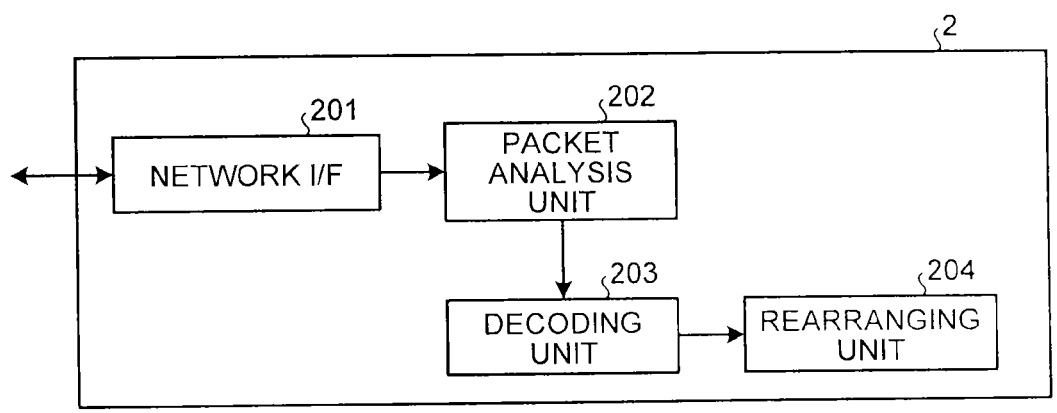
FIG. 5 is a block diagram illustrating configuration of an image receiving apparatus according to the embodiment.

A functional configuration of the image receiving apparatus 2 according to the present embodiment is described below. FIG. 5 is a block diagram illustrating a functional configuration of a function which is related to a process of decoding the encoded data transmitted from the network camera 1 into image data out of the functions of the image receiving apparatus 2 according to the present embodiment. As illustrated in FTC. 5, the image receiving apparatus 2 according to the present embodiment includes a network I/F 201, a packet analysis unit 202, a decoding unit 203, and a rearranging unit 204.

The network I/F 201 is an interface that allows the image receiving apparatus 2 to communicate with other equipment such as the network camera 1 over the network. An interface such as an Ethernet (registered trademark) interface, a Bluetooth (registered trademark), or a Wi-Fi interface may be used as the network I/F 201.

The packet analysis unit 202 acquires the packet data transmitted from the network camera 1 via the network I/F 201, obtains encoded data from the packet data, and outputs the encoded data to the decoding unit 203.

The decoding unit 203 decodes the encoded data output from the packet analysis unit 202. The encoded data is thus reconstructed by the decoding unit 203 into the image data of 8 lines rearranged by the rearranging unit 107. The decoding unit 203 outputs the reconstructed image data to the rearranging unit 204.

The rearranging unit 204 rearranges the image data of 8 lines output from the decoding unit 203 into the image data of one line. More specifically, the rearranging unit 204 reconstructs the image data of 8 lines into the image data of one line by performing, in reverse, the procedure through which the rearranging unit 107 has rearranged the image data. That is, the rearranging unit 204 functions as an image-data reconstructing unit that reconstructs the image data decoded by the decoding unit 203 into the image data that is not rearranged yet by the rearranging unit 107. The image data of one line reconstructed by the rearranging unit 204 is eventually used in displaying an image on a display unit, such as the LCD 60, of the image receiving apparatus 2, for example.

How the rearranging unit 107 according to the present embodiment rearranges image data is described below. FIGS. 6A and 6B are diagrams illustrating, for comparison with an image-data rearranging process according to the present embodiment, how image data is encoded in the conventional network camera illustrated in FIG. 3. FIGS. 7A to 7C are diagrams illustrating how image data is encoded in the network camera 1 according to the present embodiment.

In the conventional network camera illustrated in FIG. 3, such image data of 8 lines as that illustrated in FIG. 6A composed of pieces of image data each being of one line and stored in the eight (the first to eighth) respective line buffers is used as image data to be encoded by the encoding unit 104. The encoding unit 104 divides the image data of 8 lines into blocks of 8 lines by 8 pixels as illustrated in FIG. 6A and encodes the image data block by block, thereby outputting such encoded data as that illustrated in FIG. 6B.

By contrast, in the network camera 1 according to the present embodiment illustrated in FIG. 4, image data one line is stored in the single line buffer 103 as illustrated in FIG. 7A. In the image data illustrated in FIG. 7A, pixels are filled with hatching patterns changing every 8 pixels. These hatching patterns are used for convenience of the description of the rearranging process given below, and not intended to mean that pixels with the same hatching pattern are of the same pixel value or the like.

For example, the rearranging unit 107 divides the image data of one line illustrated in FIG. 7A into subblocks of 1 line by 8 pixels and rearranges the subblocks into to-be-encoded image data. The pixels of the rearranged image data illustrated in FIG. 7B are filled with the same hatching patterns as those of the image data illustrated in FIG. 7A changing every 8 pixels.

More specifically, for instance, the first to eighth pixels, filled with lines rising to the right, of the image data illustrated in FIG. 7A are arranged as the first 8 pixels on the first line of the image data illustrated FIG. 7B. For instance, the ninth to sixteenth pixels, filled with least dense dots, of the image data illustrated in FIG. 7A are arranged as the first 8 pixels on the second line of the image data illustrated in FIG. 7B.

When the rearranging unit 107 has arranged the divided image data of 8 pixels to the eighth line in this manner, the rearranging unit 107 then arranges the image data of the next 8 pixels at a position of the ninth to sixteenth pixels on the first line. By performing the sequence described above, the rearranging unit 107 rearranges the image data of one line illustrated in FIG. 7A into the image data of 8 lines illustrated in FIG. 7B in real-time. The image data of 8 lines illustrated in FIG. 7B is used as the to-be-encoded image data to be encoded by the encoding unit 104.

In short, the rearranging unit 107 functions as an image-data transforming unit that divides the image data stored in the line buffer 103 into subblocks each made up of a predetermined number of pixels and transforming the subblocks each made up of the predetermined number of pixels into to-be-encoded image data.

The encoding unit 104 divides the image data of 8 lines into blocks of 8 lines by 8 pixels as illustrated in FIG. 7B and encodes the image data block by block, thereby outputting such encoded data as that illustrated in FIG. 7G.

FIG. 8 is a diagram illustrating, in time sequence, the conventional encoding process and the encoding process according to the present embodiment. In the conventional encoding process, as illustrated at (a) FIG. 8, the encoding unit 104 encodes image data of 8 lines only after the image data of 8 lines has been buffered, and transmits the thus-encoded data.

By contrast, in the encoding process according to the present embodiment, as illustrated at (b) in FIG. 8, each time image data of one line is acquired, the rearranging unit 107 rearranges the image data. The encoding unit 101 encodes the rearranged image data and transmits the thus-encoded data. Furthermore, in parallel with transmission of the encoded data, image data of the next one line is acquired and rearranged by the rearranging unit 107.

Accordingly, first transmission of encoded data in the encoding process illustrated at (b) in FIG. 8 is earlier than that in the encoding process illustrated at (a) in FIG. 8. Furthermore, in the encoding process illustrated at (b) in FIG. 8, image data is encoded and transmitted each time image data of one line is acquired. Accordingly, the encoding process illustrated at (b) in FIG. 8 completes transmission of encoded data obtained by encoding the image data of 8 lines earlier than the encoding process illustrated at (a) in FIG. 8. In short, a delay in transmission of encoded data is reduced as illustrated in FIG. 8, for example.

FIG. 17 is a flowchart illustrating operations of elements of the network camera 1 illustrated in FIG. 4. The operations in the flowchart illustrated in FIG. 17 are an example of operations for implementing an image coding method. As illustrated in FIG. 17, the image-data acquisition unit 102 acquires image data of one line (S1701). Upon acquiring the image data of one line, the image-data acquisition unit 102 outputs the image data of one line to the line buffer 103 (S1702).

The rearranging unit 107 transforms the image data of one line stored in the line buffer 103 into to-be-encoded image data of the encoding-line number of lines (e.g., 8 lines) (S1703). When the image data of one line has been transformed by the rearranging unit 107 into the to-be-encoded image data, the encoding unit 104 encodes the to-be-encoded image data (S1704).

When the to-be-encoded image data has been encoded into encoded data by the encoding unit 104, the packet generation unit 105 packetizes the encoded data into packet data and transmits the packet data via the network I/F 106 (S1705). The procedure illustrated in FIG. 17 is repeatedly performed until all the line data is processed.

As described above, the network camera 1 according to the present embodiment transforms, each time image data of one line is stored in the line buffer 103, the image data of one line into to-be-encoded image data of 8 lines, encodes the to-be-encoded image data into encoded data, and transmits the encoded data to the image receiving apparatus 2. This can reduce a transmission delay caused by image data compression as described above with reference to FIG. 8.

In the present embodiment, the example where each time image data of one line is stored in the line buffer 103, the image data is transformed into to-be-encoded image data and then encoded is described. However, the number of lines to be transformed into to-be-encoded image data is not limited to one, but may be two or four, for example, as long as it is smaller than the encoding-line number.

FIGS. 9A and 9B are diagrams illustrating how image data of two lines are encoded. To implement encoding of image data of two lines, the network camera 1 includes two line buffers (the first and second line buffers). Such image data of two lines as that illustrated in FIG. 9A composed of pieces of the image data each being of one line and stored in the respective first and second line buffers is used as image data to be encoded by the encoding unit 104. In the image data illustrated in FIG. 9A, pixels are filled with hatching patterns changing every 8 pixels. These hatching patterns are used for convenience of the description of the rearranging process given below, and not intended to mean that pixels with the same hatching pattern are of the same pixel value or the like.

For example, the rearranging unit 107 divides the image data of two lines illustrated in FIG. 9A into subblocks of 2 lines by 8 pixels and rearranges the subblocks into to-be-encoded image data as illustrated in FIG. 9B. The pixels of the rearranged image data illustrated in FIG. 9B are filled with the same hatching patterns as those of the image data illustrated in FIG. 9A changing every 8 pixels.

More specifically, for instance, the first to eighth pixels on each of the first and second lines, filled with lines rising to the right, of the image data illustrated FIG. 9A are arranged as the first 8 pixels on the first and second lines of the to-be-encoded image data illustrated in FIG. 9B.

For instance, the ninth to sixteenth pixels on each of the first and second lines, filled with least dense dots, of the image data illustrated in FIG. 9A are arranged as the first 8 pixels on the third and fourth lines of the to-be-encoded image data illustrated in FIG. 9B.

When the rearranging unit 107 has performs arrangement up to the eighth line of the to-be-encoded image data is units of the divided image data of the subblock of 2 lines by 8 pixels in this manner, the rearranging unit 107 then arranges the image data of the next subblock of 2 lines by 8 pixels at a position of the ninth to sixteenth pixels on the first and second lines of the to-be-encoded image data. By performing the sequence described above, the rearranging unit 107 rearranges the image data of two lines illustrated in FIG. 9A into the to-be-encoded image data of 8 lines illustrated in FIG. 9B.

FIGS. 10A and 10B are diagrams illustrating how image data of four lines are encoded. To implement encoding of image data of four lines, the network camera 1 includes four line buffers (the first to fourth line buffers). Such image data of four lines as that illustrated in FIG. 10A composed of pieces of the image data each being of one line and stored in the respective first to fourth line buffers is used as image data to be encoded by the encoding unit 104. In the image data illustrated in FIG. 10A, pixels are filled with hatching patterns changing every 8 pixels. These hatching patterns are used for convenience of the description of the rearranging process given below, and not intended to mean that pixels with the same hatching pattern are of the same pixel value or the like.

For example, the rearranging unit 107 divides the image data of four lines illustrated in FIG. 10A into subblocks of 4 lines by 8 pixels and rearranges the subblocks into to-be-encoded image data as illustrated in FIG. 10B. The pixels of the rearranged image data illustrated in FIG. 10B are filled with the same hatching patterns as those of the image data illustrated in FIG. 10A changing every 8 pixels.

More specifically, for example, the first to eighth pixels on each of the first to fourth lines, filled with lines rising to the right, of the image data illustrated in FIG. 10A are arranged as the first 8 pixels on the first to fourth lines of the to-be-encoded image data illustrated in FIG. 10.

For example, the ninth to sixteenth pixels on each of the first to fourth lines, filled with least dense dots, of the image data illustrated in FIG. 10A are arranged as the first 8 pixels on the fifth to eighth lines of the to-be-encoded image data illustrated in FIG. 10B.

When the rearranging unit 107 has performed arrangement up to the eighth line of the to-be-encoded image data in units of the divided image data of the subblock of 4 lines by 8 pixels in this manner, the rearranging unit 107 then arranges the image data of the next subblock of 4 lines by 8 pixels at a position of the ninth to sixteenth pixels on the first to fourth lines of the to-be-encoded image data. By performing the sequence described above, the rearranging unit 107 rearranges the image data of four lines illustrated in FIG. 10A into the to-be-encoded image data of 8 lines illustrated in FIG. 10B.

Figure 11:
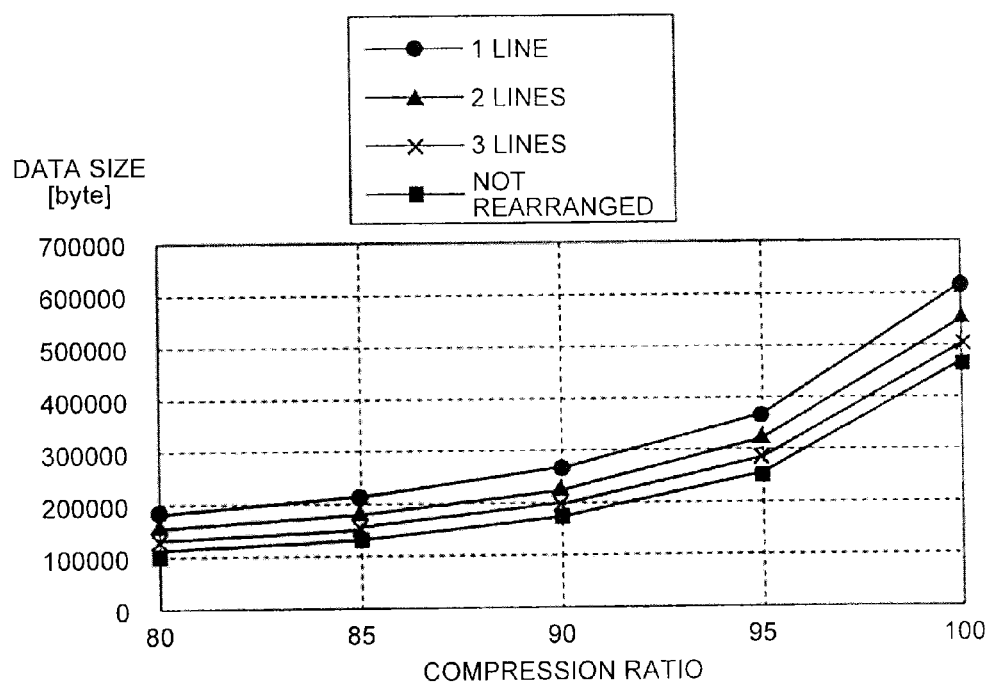
FIG. 11 is a graph of compression ratio of to-be-encoded image data versus data sizes with different numbers of lines used for encoding in the network camera according to the embodiment.

FIG. 11 is a graph of compression ratio of to-be-encoded image data versus data size with different numbers of lines used for encoding in the network camera 1 according to the present embodiment. As illustrated in FIG. 11, when comparison is made at the same compression ratio, the data size increases in the following order: image data of one line, two lines, three lines, and not rearranged (i.e., 8 lines).

This can be ascribed to characteristics of JPEG compression. JPEG compression reduces the amount of data by removing high-frequency components, to which human vision is less sensitive, from an image. Natural images such as images obtained by capturing the images of outdoor scenery have a feature that the images have small high-frequency components and, accordingly, compression ratios of these images compressed by JPEG are generally high. However, when line data is rearranged as in the present embodiment, because to-be-encoded image data has a large number of spatially-discontinuous regions (i.e., high-frequency components) where color changes sharply, compression ratio of JPEG-compressed images decreases.

Accordingly, as illustrated in FIG. 11, as the number of lines (hereinafter, "the number of rearrangement lines") of image data to be rearranged by the rearranging unit 107 increases, the discontinuous regions decrease, and the compression ratio is improved. Meanwhile, as described earlier, when the number of rearrangement lines is two, two line buffers are to be used; when the number of rearrangement lines is four, four line buffers are to be used. In short, as the number of rearrangement lines increases, the number of the line buffers increases, which increases circuit size. Furthermore, as the number of rearrangement lines increases, the time it takes until the image data of rearrangement lines is buffered is lengthened. As a result, a delay in transmission of encoded data increases.

FIG. 18 is a flowchart illustrating operations of elements of the network camera 1 illustrated in FIG. 4. The operations in the flowchart illustrated in FIG. 18 are an example of operations for implementing an image coding method. In the flowchart illustrated in FIG. 18, image data is encoded in units of a number of lines, the number being two or four in the above-described examples and being smaller than the encoding-line number.

As illustrated in FIG. 18, the image-data acquisition unit 102 acquires image data of one line (S1801). Upon acquiring the image data of one line, the image-data acquisition unit 102 outputs the image data of one line to a line buffer (S1802).

The rearranging unit 107 determines whether or not image data of a predetermined number of lines necessary or encoding have been stored in the line buffer(s) (S1803). For instance, when the necessary number of lines is two, the rearranging unit 107 determines whether or not line data has been stored in each of the first and second line buffers. If the image data of the predetermined number of lines has not been stored in the corresponding line buffer(s) yet (NO at S1803), the rearranging unit 107 is held on standby. The image-data acquisition unit 102 acquires image data of the next one lice (S1801) and outputs the image data of one line to another line buffer (S1802).

If the image data of the predetermined number of lines has been stored in the corresponding line buffer(s) (YES at S1803), the rearranging unit 107 transforms the line data stored in the line buffer (s) into to-be-encoded image data of the encoding-line number of lines (e.g., 8 lines) (S1804).

When the image data of the predetermined number of lines has been transformed by the rearranging unit 107 into the to-be-encoded image data, the encoding unit 104 encodes the to-be-encoded image data (S1805). When the to-be-encoded image data has been encoded into encoded data by the encoding unit 104, the packet generation unit 105 packetizes the encoded data into packet data and transmits the packet data via the network I/F 106 (S1806). The procedure illustrated in FIG. 18 is repeatedly performed until all the line data is processed.

Second Embodiment

A second embodiment of the invention is described below. As described above in the first embodiment, it is enough that the number of rearrangement lines is smaller than the encoding-line number. Furthermore, as described above with reference to FIG. 11, as the number of rearrangement lines increases, the compression ratio is improved; in other words, the size of data compressed the same compression ratio decreases.

The number of rearrangement lines can be determined depending on a network communication status of the image transmitting/receiving system by utilizing these features. More specifically, when, for instance, communications traffic on the network is light (or, in other words, when the amount of data that can be transmitted is large), the number of rearrangement lines is determined to one. When the number of rearrangement lines is one, although the compression ratio of image data is lower (or, in other words, the size of data compressed at the same compression ratio is larger) than that when the number of rearrangement lines is two or larger, a delay in transmission of encoded data decreases.

When, for instance, communications traffic on the network is busy (or, in other words, when the amount of data that can be transmitted is small), the number of rearrangement lines is determined to four. When the number of rearrangement lines is four, although a delay in transmission of encoded data is larger than that when the number of rearrangement lines is smaller than four, the compression ratio of image data is improved (or, in other words, the size of data compressed at the same compression ratio decreases).

Figure 12:
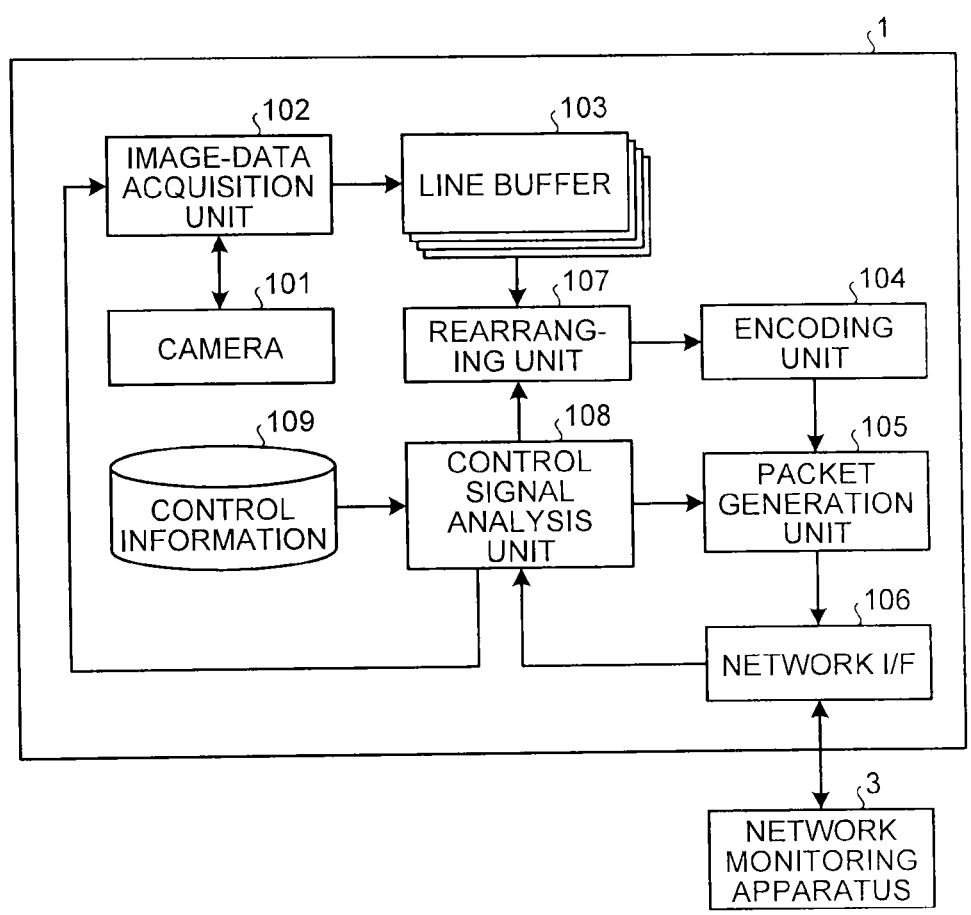
FIG. 12 is a diagram illustrating a functional configuration of the network camera according to a second embodiment of the present invention.

In the second embodiment, the number of rearrangement lines is determined depending on the amount of data that can be transmitted via a network. FIG. 12 is a block diagram illustrating a functional configuration of the network camera 1 according to the second embodiment. As illustrated in FIG. 12, the network camera 1 according to the second embodiment differs from the configuration illustrated in FIG. 4 in additionally including a control signal analysis unit 108 and a control-information storage unit 109. Description of elements that perform similar operations to those illustrated in FIG. 4 is omitted.

In the second embodiment, the number of rearrangement lines is changeable to any one of one, two, and four. Accordingly, the network camera 1 includes the four line buffers 103 and uses one or more of the line buffers 103 the number of which corresponds to the rearrangement lines.

The control signal analysis unit 108 receives a control signal transmitted from a network monitoring apparatus 3 via the network I/F 106 and determines the number of rearrangement lines. After determining the number of rearrangement lines, the control signal analysis unit 108 outputs the thus-determined number of rearrangement lines to the image-data acquisition unit 102, the rearranging unit 107, and the packet generation unit 105.

More specifically, for instance, the network monitoring apparatus 3 transmits information indicating a level of volume of traffic (hereinafter, "traffic level"), which is obtained by monitoring network traffic or the like on the image transmitting/receiving system, as a control signal to the network camera 1. For instance, volumes of network traffic may be classified in advance into the following three traffic levels: "0", "1", and "2", from smallest to largest traffic volume.

Upon receiving a control signal indicating such a traffic level as that described above, the control signal analysis unit 108 retrieves the number of rearrangement lines associated with the traffic level from the control-information storage unit 109. That is, the control signal analysis unit 108 functions as a line-number determining unit that determines the number of rearrangement lines depending on communication status information indicating a network communication status.

Figures 13, 14:
FIG. 13 is a diagram illustrating control information according to the second embodiment.
FIG. 14 is a block diagram illustrating a structure of a packet according to the second embodiment.

FIG. 13 is a diagram illustrating an example of control information stored in the control-information storage unit 109. As illustrated in FIG. 13, the control information is configured as a table where each traffic level is associated with the number of rearrangement lines. For instance, when the traffic level is "0", the system is in a condition where the volume of network traffic is small and even if a large volume of data is transmitted, a delay is less likely to occur. Put another way, in this condition, the amount of data that can be transmitted is large. Accordingly, the number of lines "1" with which the compression ratio is low but transmission delay is small is associated with the traffic level "0". For instance, when the traffic level is "2", the system is a condition where the volume of network traffic is large and it is desirable to minimize the amount of data to be transmitted. Accordingly, the line number "4" with which transmission delay is large but the compression ratio is high is associated with the traffic level "2".

The image-data acquisition unit 102 outputs image data of lines, the number of which is the number of rearrangement lines output from the control signal analysis unit 108, to the line buffers 103, the number of which is the number of rearrangement lines, line data by line data. When the image data of the lines, the number of which is the number of rearrangement lines output from the control signal analysis unit 108, has been stored in the line buffers 103, the rearranging unit 107 rearranges the image data of the lines, the number of which is the number of rearrangement lines, into to-be-encoded image data and outputs the to-be-encoded image data to the encoding unit 104.

The packet generation unit 105 adds a control signal output from the control signal analysis unit 108 to the encoded data output from the encoding unit 104 to perform packetizing. FIG. 14 is a diagram illustrating a configuration of a structure of a packet generated by the packet generation unit 105. As illustrated in FIG. 14, the packet generated by the packet generation unit 105 according to the second embodiment contains a rearrangement ID by which the number of rearrangement lines can be identified. For instance, when the number of rearrangement lines is "1", the rearrangement ID may be set to "0"; when the number of rearrangement lines is "2", the rearrangement ID may be set to "1"; when the number of rearrangement lines is "3", the rearrangement ID may be set to "2".

Figures 15, 16:
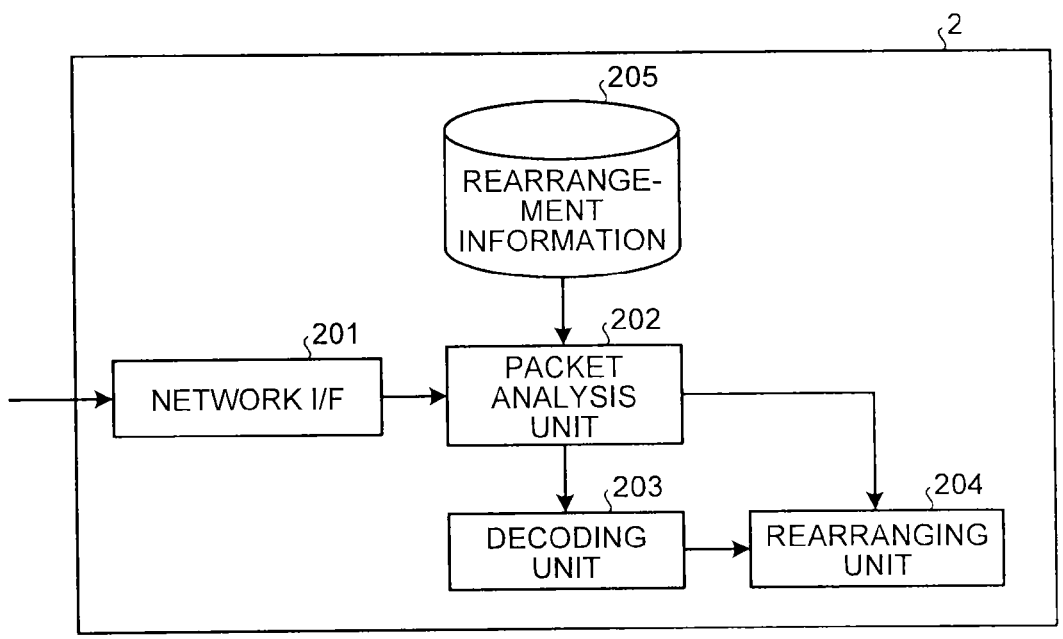
FIG. 15 is a block diagram illustrating a functional configuration of the image receiving apparatus according to the second embodiment.
FIG. 16 is a diagram illustrating rearrangement information according to the second embodiment.

A functional configuration of the image receiving apparatus 2 according to the second embodiment is described below. FIG. 15 is a diagram illustrating an example of the functional configuration of the image receiving apparatus 2 according to the second embodiment. As illustrated in FIG. 15, the image receiving apparatus 2 according to the second embodiment differs from the configuration illustrated in FIG. 5 in additionally including a rearrangement-information storage unit 205. Description of elements that perform similar operations to those illustrated in FIG. 5 is omitted.

FIG. 16 is a diagram illustrating an example of rearrangement information stored in the rearrangement-information storage unit 205. As illustrated in FIG. 16, the control information is configured as a table where each rearrangement ID, which is contained in the packet illustrated in FIG. 14, is associated with the number of rearrangement lines.

The packet analysis unit 202 acquires packet data transmitted from the network camera 1 via the network I/F 201 and acquires encoded data and a rearrangement ID from the received packet. The packet analysis unit 202 determines the number of rearrangement lines by retrieving the number associated with the acquired rearrangement ID from the rearrangement-information storage unit 205. For instance, when the acquired rearrangement ID is "0", the packet analysis unit 202 can determine that the acquired encoded data is image data of one line.

Furthermore, the packet analysis unit 202 outputs the acquired encoded data to the decoding unit 203, and outputs the determined number of rearrangement lines to the rearranging unit 204. The rearranging unit 204 rearranges the image data of 8 lines output from the decoding unit 203 into image data of lines, the number of which is the number of rearrangement lines output from the packet analysis unit 202.

As described above, in the second embodiment, the number of rearrangement lines is determined depending on a network communication status of the image transmitting/receiving system. Thus, the second embodiment makes it possible to determine whether to prioritize a high compression ratio over a small transmission delay or vice versa, thereby transmitting data efficiently depending on a network status while reducing transmission delay.

The second embodiment has been described by way of the example in which the control signal is transmitted from the network monitoring apparatus 3, which is an apparatus independent of the network camera 1. Alternatively, configuration in which the network camera 1 itself monitors the network traffic status and determines the number of rearrangement lines depending on the status may be employed.

In the first and second embodiments, the network camera 1 is used as an example of the image processing apparatus. However, the image processing apparatus is not limited to the network camera 1 but can be any image processing apparatus so long as having a configuration for encoding image data and transmitting the encoded image data to other equipment.

An embodiment is a computer program product comprising a non-transitory computer-readable medium containing an information processing program, the program causing a computer of an image coding device that encodes image data in units of encoding line number that is number of lines necessary for implementing encoding, to perform: transforming image data of lines, number of which is smaller than the encoding-line number, into to-be-encoded image data of the encoding-line number of lines; and encoding the to-be-encoded image data.

According to an embodiment, a transmission delay caused by image data compression can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image coding device that encodes image data in units of an encoding line number that is a number of lines necessary for implementing encoding, the image coding device comprising:
   processing circuitry configured to
      transform image data of lines, a number of which is smaller than the encoding-line number, into to-be-encoded image data of the encoding-line number of lines, and
      encode the to-be-encoded image data.

2. The image coding device according to claim 1, wherein the processing circuitry
   determines the number of lines of the image data to be transformed into the to-be-encoded image data depending on communication status information indicating a communication status of a network over which the encoded image data is to be transmitted, and
   transforms the image data of the determined number of lines into the to-be-encoded image data.

3. The image coding device according to claim 2, wherein the communication status information indicates an amount of data transmittable over the network, and
   the processing circuitry determines the number of lines such that the larger the amount of transmittable data, the smaller the number of lines.

4. The image coding device according to claim 1, wherein the processing circuitry divides each line of the image data to be transformed into subblocks, each of the subblocks being made up of a predetermined number of pixels, and rearranges the subblocks into image data of the encoding-line number of lines.

5. The image coding device according to claim 1, wherein the image data is generated by capturing, by an image capturing device, an image of an image capture subject, and
   the processing circuitry transforms the generated image data in real-time.

6. An image processing apparatus comprising:
   the image coding device according to claim 1,
   wherein the processing circuitry transmits the encoded image data to another apparatus.

7. An image transmitting/receiving system that transmits and receives image data encoded in units of encoding line number that is a number of lines necessary for implementing encoding, the image transmitting/receiving system comprising:
- processing circuitry configured to
  - transform image data of lines, a number of which is smaller than the encoding-line number, into to-be-encoded image data of the encoding-line number of lines,
  - encode the to-be-encoded image data;
  - transmit encoded data that is the encoded image data,
  - decode the transmitted encoded data, and
  - reconstruct decoded image data into not-yet-transformed image data.

8. An image coding method that encodes image data in units of encoding line number that is a number of lines necessary for implementing encoding, the image coding method comprising:
- transforming, via processing circuitry, image data of lines, a number of which is smaller than the encoding-line number, into to-be-encoded image data of the encoding-line number of lines; and
- encoding, via the processing circuitry, the to-be-encoded image data.

\* \* \* \* \*